United States Patent [19]

Kochanneck

[11] 4,252,488
[45] Feb. 24, 1981

[54] STORAGE RETRIEVAL SYSTEM WITH PIVOTED HOLDER FRAMES

[76] Inventor: Uwe Kochanneck, Neuer Graben 81, 4600 Dortmund 1, Fed. Rep. of Germany

[21] Appl. No.: 855,611

[22] Filed: Nov. 29, 1977

Related U.S. Application Data

[63] Continuation-in-part of Ser. No. 691,555, May 25, 1976, which is a continuation-in-part of Ser. No. 680,876, Apr. 27, 1976, abandoned.

[30] Foreign Application Priority Data

| May 3, 1975 | [DE] | Fed. Rep. of Germany | 2519864 |
| Jun. 18, 1975 | [DE] | Fed. Rep. of Germany | 2527150 |
| May 3, 1976 | [FR] | France | 7613159 |
| Jun. 18, 1976 | [FR] | France | 7618709 |
| Nov. 30, 1976 | [DE] | Fed. Rep. of Germany | 2654194 |

[51] Int. Cl.³ .................................................. B65G 47/02
[52] U.S. Cl. ............................... 414/331; 312/202; 414/243
[58] Field of Search ............... 214/16.1 A, 16.1 BA, 214/16.1 BB, 16.1 R, 16 B, 16.4 R; 312/197, 252, 202, 59, 339, 198; 108/103, 104, 20, 21; 211/1.5; 414/331, 248, 242, 243, 253, 255, 256, 261, 263, 264

[56] References Cited

U.S. PATENT DOCUMENTS

| 1,857,431 | 5/1932 | Clark | 214/16.1 BB |
| 1,870,069 | 8/1932 | Rugg | 214/16.1 BB X |
| 2,829,780 | 4/1958 | Boor | 211/1.5 X |
| 3,236,577 | 2/1966 | Anders et al. | 214/16 B X |
| 3,670,867 | 6/1972 | Traube | 214/16 B X |

FOREIGN PATENT DOCUMENTS

| 696818 | 10/1930 | France | 108/20 |
| 1427294 | 12/1965 | France | 211/1.5 |

*Primary Examiner*—Stephen G. Kunin
*Assistant Examiner*—Edmond G. Rishell, Jr.
*Attorney, Agent, or Firm*—Michael J. Striker

[57] ABSTRACT

An article storage and retrieval system has a plurality of annular and generally concentric tracks of any desired shape each carrying a train of holder frames each having a pair of ends spaced apart by a gap. Each train has at each of the holder frames a pivot connecting each frame to the adjacent frames for relative pivoting of the frames and adaptation of the train to any shape track. A set of vertically spaced holders is removably supported in each of the holder frames so that when the gaps thereof are aligned in a service aisle it is possible to obtain access to any of the holders.

8 Claims, 7 Drawing Figures

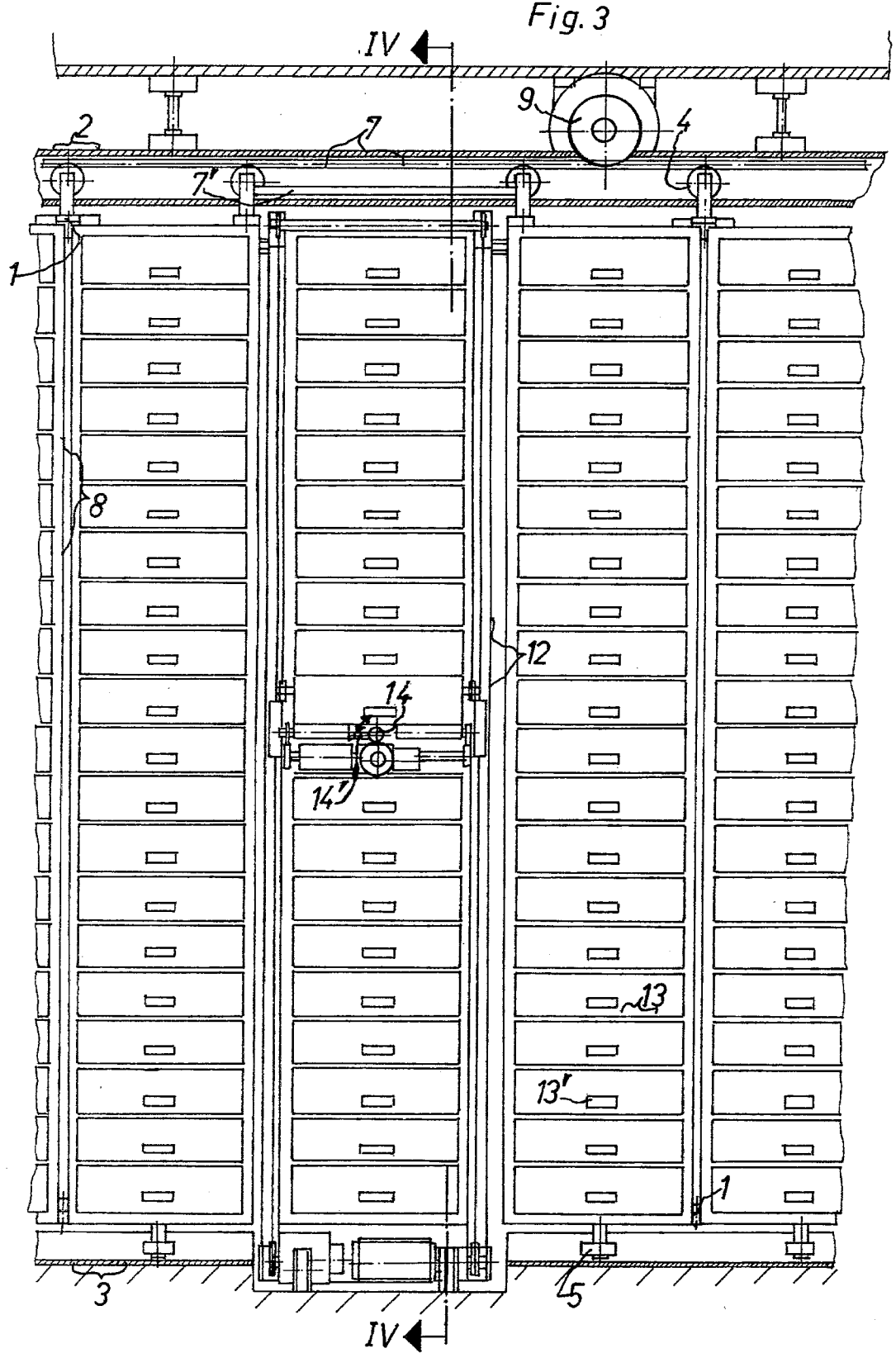

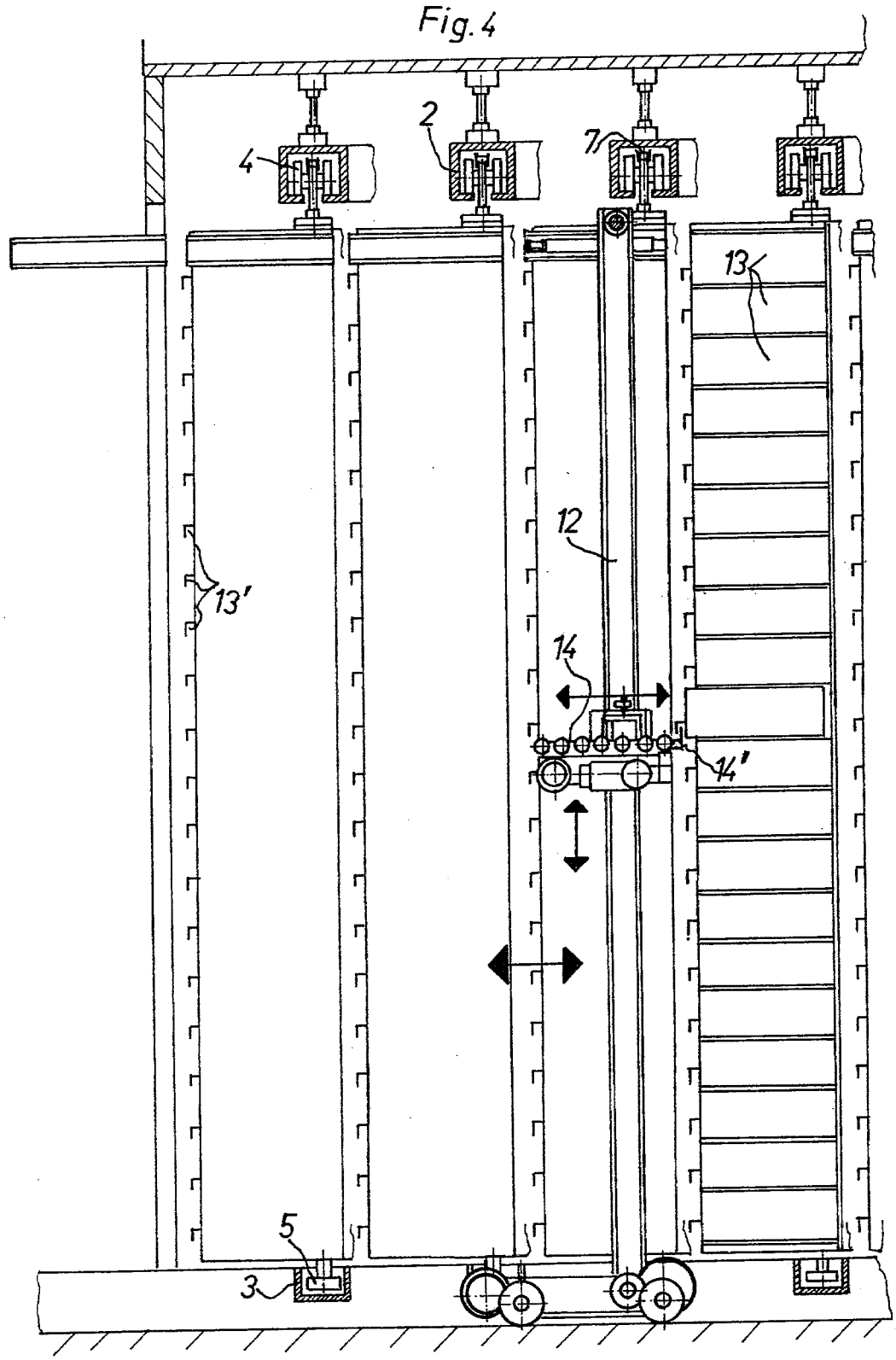

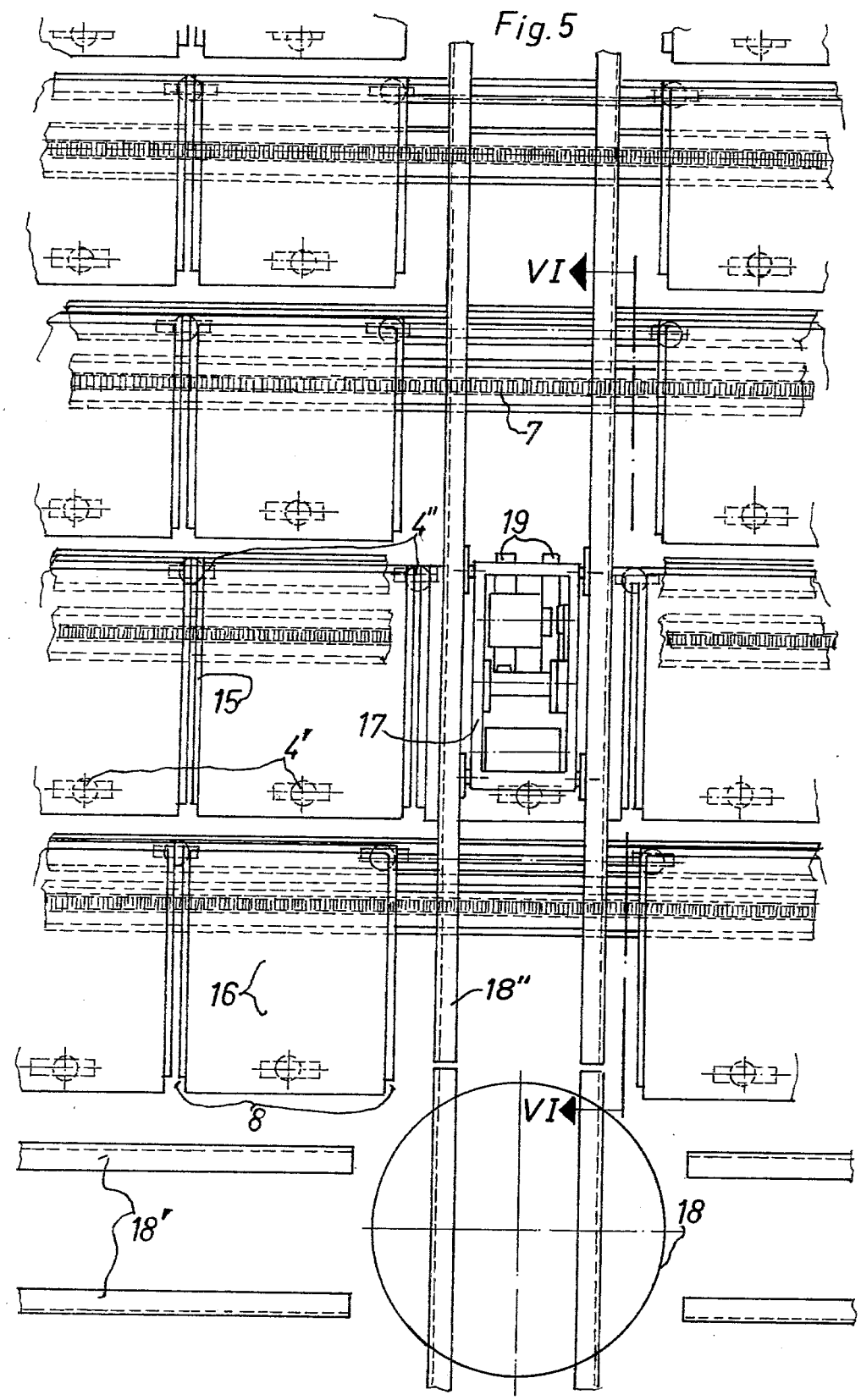

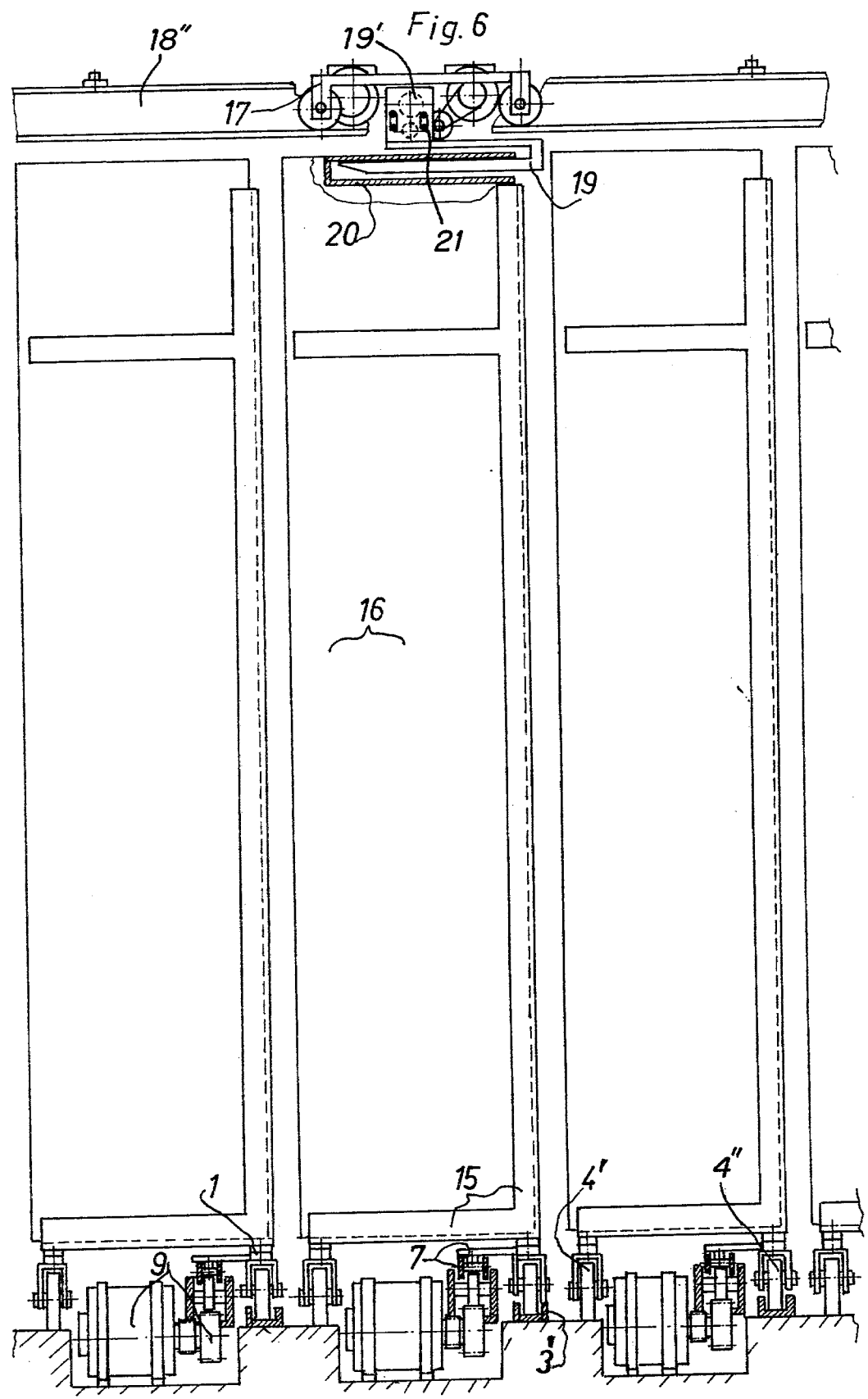

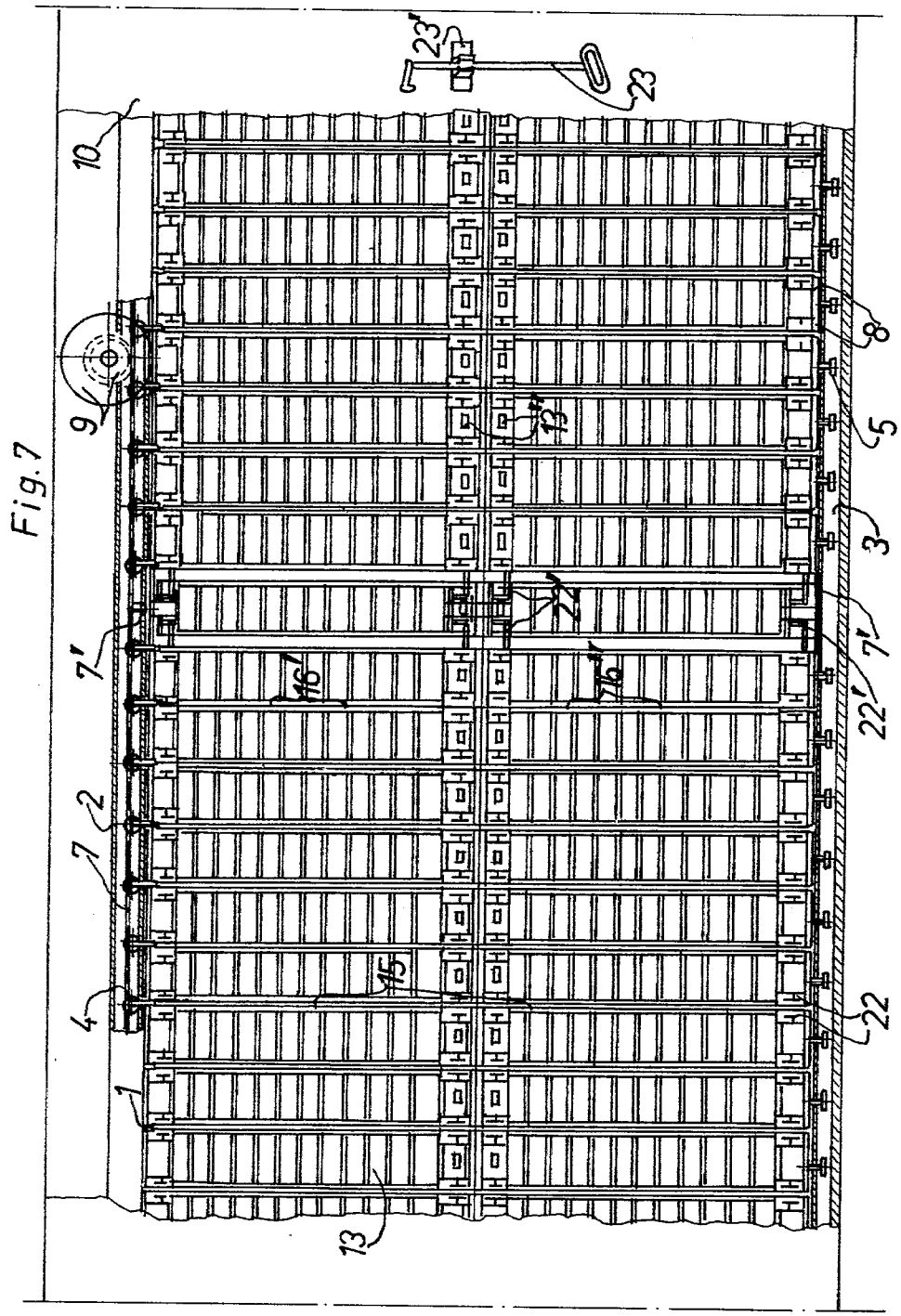

STORAGE RETRIEVAL SYSTEM WITH PIVOTED HOLDER FRAMES

CROSS-REFERENCE TO RELATED APPLICATIONS

This application is a continuation-in-part of my copending application Ser. No. 691,555 filed May 25, 1976, as a continuation-in-part of my copending application Ser. No. 680,876 filed Apr. 27, 1976, now abandoned.

BACKGROUND OF THE INVENTION

The present invention relates to an article retrieval and storage system. More particularly this invention concerns such systems which can be used for the storage in a relatively limited floor space of a large quantity of relatively small articles such as books, electronic parts, or the like.

In my above-cited copending application Ser. No. 680,876 I disclose a storing and retrieving method wherein each of the articles is held in a respective holder. A first group of the holders is arrayed in a first train displaceable about a first annular track and having a pair of ends spaced apart by a gap. A second group of holders separate from the first group is arrayed in a second train displaceable about a second annular track to one side of the first track. One of these tracks lies within the other track. Access can be gained to the holders of the second group from a fixed station to the other side of the first track by displacing the first train into a position with its gap aligned with the station and by displacing the second train into a position with the desired holder aligned with the gap and therethrough with the station. Thus access may be had to this one holder and the article therein from the station through the gap. Furthermore access may be had to any of the holders of the second train simply by displacing the desired holder into alignment with the access station.

Thus with the system according to my earlier invention it is possible from an access station inside or outside a plurality of annular tracks to gain access to any of a multiplicity of holders arrayed in several trains each on a respective one of the tracks. Such a system may have, for instance, seven such tracks each of which has a respective train of holders with a gap in the train so that access can be had through each train to the train on the other side of it.

In accordance with yet another feature of this previous invention each train has two subgroups of holders, an inner group accessible only from the inside of the respective track and an outer subgroup only accessible from the outside of the respective track. Thus the number of addresses or locations at which the various articles can be stored is virtually doubled with a given floor space.

According to this earlier invention the tracks are circularly concentric. The access station is provided outside the concentric array of tracks. Thus it is possible to gain access to the articles in any one of the tracks merely by displacing it and it alone into a position aligned with the aisle formed by the gaps of all of the trains. In an arrangement wherein each of the trains has an inner and outer subgroup of holders as described immediately above, the operator need merely walk down the aisle beyond the track on which the train whose inner group he wishes access to runs. Once radially inside this track a starter device, such as a simple start or enter switch, is pressed in order to displace the train on the track radially outside the operator into a position with the desired holder aligned with the aisle formed by the aligned gaps.

According to yet another feature of my previous invention the holders of each subgroup are arranged in vertical rows and an elevator is provided for displacing an operator vertically up and down adjacent each row of each subgroup. These elevators may be provided on tracks extending vertically along an end of each of the trains in addition to at the access station so that an operator may be raised to a position horizontally in line with the desired holder.

According to another feature of the invention of my application Ser. No. 680,876 a third group of holders is arrayed in a stationary row between two tracks. This row may be formed with a gap aligned with the access station. In addition means may be provided on the trains and/or on the stationary row which can be vertically aligned into juxtaposition with a respective holder and can serve to automatically remove a holder and/or an article from an adjacent track or row. Thus the system can be set up automatically to place the articles to be stored in respective storage locations and to remove them therefrom and deliver them to the access station.

According to yet another feature of this invention a plurality of such storage systems may themselves be mounted on a single annular track so as to be displaceable past a single access station. Thus it is possible to greatly increase the number of storage locations accessible from a single access station. Such an arrangement is extremely useful in systems wherein a single person must have access to a great quantity of different articles, albeit one at a time. This is the case in a court, for instance, where a single clerk must be able readily to obtain any of a vast number of docket files, corporation registration papers, or the like.

Furthermore in my above-cited copending application Ser. No. 691,555 I disclose a storage system comprising a floor support having an upright axis, a plurality of generally cylindrical arrays of receptacles arranged in horizontally annular and vertical rows standing on the support with the arrays nested one within the other and all concentric with the axis. Each array has a radially throughgoing and vertical slot and is provided with means for rotating independently of the other arrays on the support about the axis.

According to another feature of this earlier invention each of the receptacles has a closed side turned toward the axis and an open side turned away from the axis. Each of the gaps is at least as wide as one of the vertical rows of the receptacles. Thus it is possible to gain access to any of the receptacles from an access station located radially outside the nest of arrays of the receptacles. The gaps of the receptacles are normally all aligned and in order to gain access to any receptacle the respective array is merely rotated about its axis until the desired receptacle is aligned with the aisle formed by the radially aligned gaps of the other arrays.

According to another feature of my earlier invention a cylindrical wall is secured to the support and surrounds the array. This wall is formed with a vertically elongated opening or door alignable radially with the gaps. Thus the articles stored in the receptacles are all well protected within the device. Furthermore a lamp is provided in at least one of the gaps so that a person reaching in for an article in one of the receptacles can readily see what he or she is doing.

Each of the arrays is provided with an annular and endless plate bridging the respective gap. Such plates are provided on the bottom of all of the arrays and, in the case of an automatic arrangement, are also provided on the top of each array. In a manual system hand grips or the like are provided on the top plate in order to allow a user readily to manually rotate the desired array into a position with the desired receptacle aligned with the gaps of the other arrays.

In accordance with another feature of my earlier invention a plurality of motors is secured to the roof of a housing fixed to the floor support and each have a roller engaging the top of a respective array. Thus each motor can rotate the respective array in either direction around its rotation axis. Such an arrangement is combined with control means that is connected to a sensor for ascertaining the angular position of each of the arrays and to all of the motors so that this control means can operate any of these motors to move any of the arrays into any desired position.

The arrays are all rotatable on rollers which are received within circularly angular and concentric grooves formed in the floor of the support.

Two such systems may be mounted in a single housing with a single input station having a keyboard provided for both devices or a single keyboard may be provided for the two devices. It is also possible to mount one such set of arrays on a post carried on a roller-type base so that it can be displaced to a location convenient to a user. Such a base may be vertically adjustable in order to allow a user to gain access to the arrangement from a sitting or standing position. Such an arrangement can, for instance, be used in a parts-supply store having a multiplicity of separate small parts which must be cataloged and readily accessible.

These systems represent considerable advances over the prior-art storage arrangements, however, they are often only applicable to certain floor plans. More particularly most of them can only be efficiently used when fitted in a cylindrical space.

SUMMARY OF THE INVENTION

It is an object of the present invention to provide an improved article retrieval and storage system.

Another object is to further the principles in the above-discussed copending applications.

Yet another object is to provide an improved storage system which can be adapted to floor spaces of virtually any desired configuration.

These objects are attained according to the instant invention in an article storage and retrieval system wherein each of a plurality of annular and generally concentric tracks has a respective train of holder frames. Each of these trains of frames is displaceable around the respective track and each has a pair of ends spaced apart by a gap as described above with reference to my previous applications. Each of these frames holds a set of vertically spaced holders which are removably supported in each of the holder frames and can be manually removed therefrom draw-fashion, or slipped out by automatic means displaceable in the aisle formed when all of the gaps of all of the trains are aligned.

According to the instant invention each of the holder frames is secured to each of the adjacent frames by means of a respective pivot fixed relative to the respective frame so that the trains are flexible and can follow a non-circular track. Thus in accordance with the present invention the system can be fit into a rectangular floor plan, only rounding the track slightly at the corners. It is possible to follow an even less regular shape, as for example a shape having a concave side, or even a crescent shape. All that is necessary is that the innermost track have no bend that is too sharp or has too small a radius of curvature for the respective train to pass around it. The system according to the present invention can therefore be adapted to virtually any floor plan and can be custom-made for virtually any available space.

In accordance with yet another feature of this invention each of the tracks is provided with a respective siding that extends laterally or tangentially away from the respective track so that, if desired, an entire train or a portion thereof can be displaced off the respective track for servicing, replacement, or the like. Such an arrangement is totally impossible with the systems according to the prior art which all necessitate relatively rigid trains which cannot flex and follow any desired path.

According to yet another feature of this invention each of the frames constitutes an outer frame provided wtih wheels, rollers, or the like for displacement along the respective track, and an inner frame which is removably secured in the outer frame. This inner frame itself carries the respective set of holders and is transversely displaceable out of the outer frame so that it is possible to remove the entire contents of a given frame and work with all of the holders thereof without tying up the entire system. It is also possible according to this invention to provide two such inner frames in each of the outer frames, each such inner frame having a respective set of holders.

The inner frames according to the instant invention can each be provided at their upper edges with a laterally or transversely open pocket in which is engageable a fork or pick-up element of a device displaceable above the aisle along a path. Thus this device can pick one of the inner frames out of the respective outer frame and displace it completely out of the system where the user can then have leisurely access to all of the holders thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view taken in the direction of line III—III of FIG. 1;

FIG. 4 is a section taken along line IV—IV of FIG. 3;

FIG. 5 is a top view of a detail of another arrangement according to this invention;

FIG. 6 is a section taken along line VI—VI of FIG. 5; and

FIG. 7 is a side view of another arrangement according to the instant invention.

DESCRIPTION OF THE PREFERRED EMBODIMENTS

Figure 1:
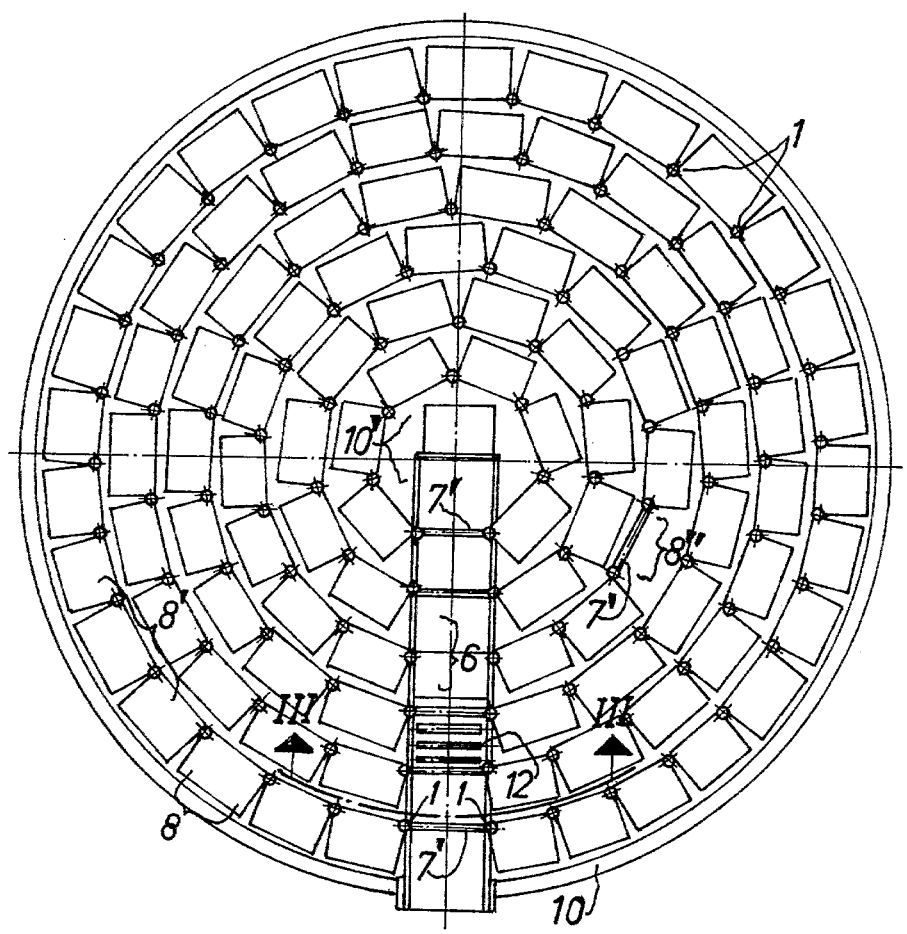
FIG. 1 is a top largely schematic view of a system according to the present invention.

As shown in FIGS. 1, 3 and 4 an article storage and retrieval system according to the present invention has a plurality, here six, of upper circular tracks 2 under each of which is displaceable a train 8' of holder frames 8 each in turn holding twenty drawer-like holders 13 having downwardly open handles 13'. The frames 8 are secured together at their corners at vertical pivots 1 formed as simple hinge joints and one holder of each assembly is replaced by a rigid rod 7' coupling together the two end holders and forming a gap 8". In addition a coupling chain 7 secured at each of the pivots 1 is in mesh with a sprocket of a drive 9 so that the respective motor can displace the respective chain or train 8' in either direction about the respective upper track 2.

A pair of rollers 4 is provided at each of the pivots 1 and rides on inwardly turned flanges of the rails 2 so that the frames 8 are suspended from the rails 2. At their lower ends the frames 8 are each provided at each corner with a respective roller 5 received in an upwardly open C-section channel 3 that lies directly below the upper rail 4. Thus the trains 8' are effectively guided around their respective circular tracks.

At the center the system has an empty space 10' which may house controlling circuitry and operating gear. Furthermore the entire system is contained within a cylindrical outer wall 10 having a door at a station aligned with a service aisle 6 that is formed when the gaps 8" are all aligned with the service station.

This service aisle is formed as a recessed path best visible in FIG. 3 and is provided with a pick-up device 12 having a pair of vertical rails along which is displaceable a roller table 14. A pick-up element 14' acts as a hook and can be swung up under a handle 13' and then retracted radially of the array of trains 8' to pull the respective holder 13 out of the respective frame 8. Opposite actuation can replace a holder in the frame. The vertical positioning of the table 14 as well as its operation is described in my above-cited copending applications whose entire disclosures are herewith fully incorporated by reference.

Figure 2:
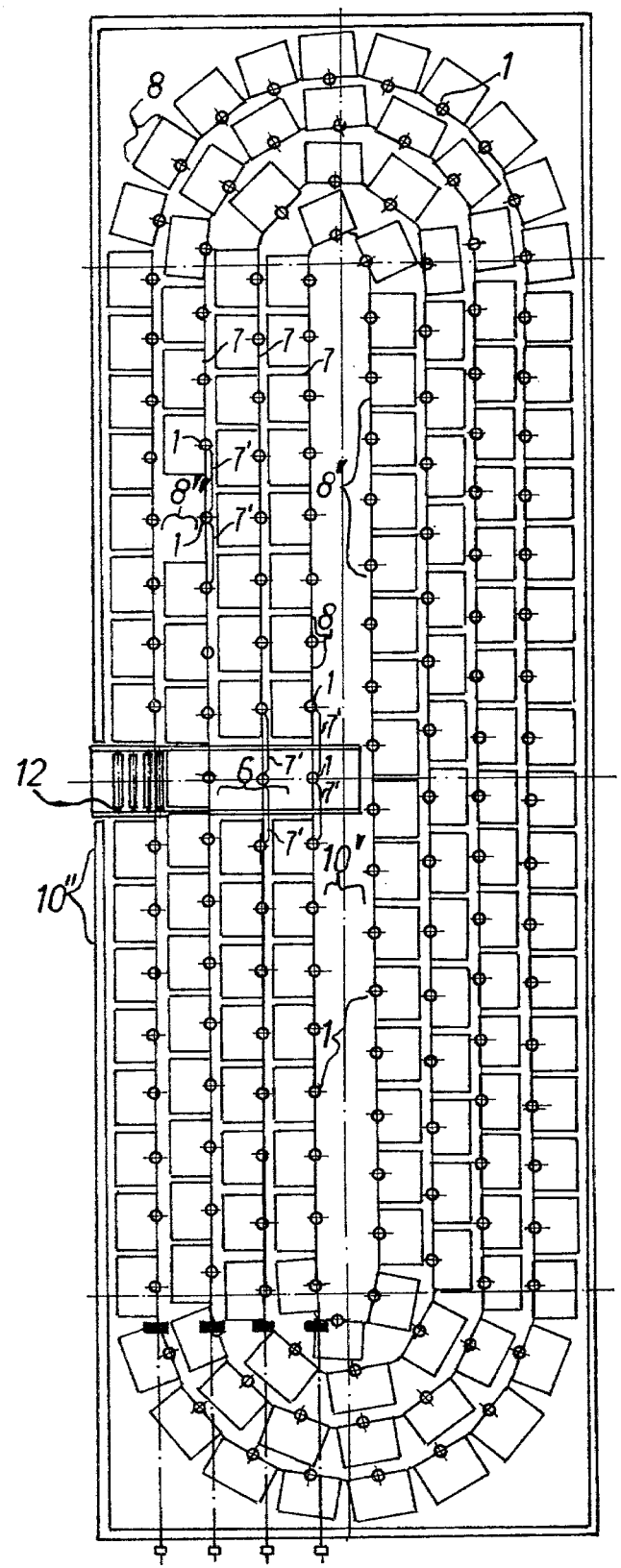
FIG. 2 is another top schematic view of a system according to this invention.

FIG. 2 shows an arrangement which is identical to that of FIG. 1 except that here a rectangular outer wall 10" contains an elongated array of trains 8' which are otherwise identical to those of FIGS. 1, 3 and 4. In addition FIG. 2 shows how each of the trains 8' has the gap 8" alignable with the door or opening in the wall 10". In this arrangement the rods 7' are releasably connected at their ends to the juxaposed pivots 1 in the gap 8" so that the trains can be opened up and slid out. Furthermore here each of the pivots 1 is provided at the center of the respective frame 8 rather than at the corner thereof. The chains 7 may here serve as the sole coupling from pivot 1 to pivot 1.

As shown in FIGS. 5 and 6 each of the holders 8 may in fact be formed by an outer holder frame 15 and an inner holder frame 16, the latter holding a plurality of drawers 13 (FIG. 3). A carrying and pick-up device 17 is displaceable on rails 18" extending along the service aisle or path 6, but above the loading and unloading device 12, and has a fork 19 engageable in a pick-up recess or pocket 20 at the top of each of the inner frames 16. A small turntable 18 provided at the outer end of the service aisle can divert the device 17 to a siding 18' extending parallel to the outer wall of the system.

The vertical displacement of the fork 19 is effected by a power driven eccentric 21 of a conventional design arranged on the device 17 and supporting the fork 19 at point 19' so that after the fork 19 is engaged in the recesses 20 of a frame 16 it can lift it free of the frame 15 and slide it out of the frame 15. To this end lateral rollers may be provided to aid in the guiding of the frames 15 and 16 relative to each other.

FIG. 6 also shows how here the drive 9 is provided underneath the trains 8' and each outer frame 15 is pivoted to the other frames 15 at its corners. At each pivot 1 there is provided a roller 4" engageable in an upwardly open floor rail 3', and in the middle of the other side of each of the outer frames 15 is a single roller 4'. Thus each outer frame 15 is supported on three rollers 4' and 4". The roller 4' rides directly on the floor.

Finally FIG. 7 shows another arrangement wherein once again the same reference numerals are used for identical structure. Here, however, the outer frames 15 each hold a pair of inner frames 16' and 16", the latter below the former. Rollers 22' are engaged in rails 22 at the bottom of each of the inner frames 16' and 16". Furthermore a hook 23 carried in a clip 23' on the outer wall 10 can be used to manually pull either of the frames 16' or 16" draw-fashion out of the respective outer frame 15. This hook 23 is mainly used when it is desired to reach into an inner lying train through the service aisle 6.

The system according to the present invention can be adapted for practically any shape floor plan, and can easily be serviced by pulling any of the trains completely out of the system. At the same time the holders 13 are all interchangeable and the system can readily be set up with a computer controller for pulling out any desired drawer 13.

It will be understood that each of the elements described above, or two or more together, may also find a useful application in other types of systems differing from the types described above.

While the invention has been illustrated and described as embodied in a storage and retrieval system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An article storage and retrieval system comprising:
    a plurality of annular and generally concentric tracks;
    a train of holder frames in each of said tracks displaceable therearound and each having a pair of ends spaced apart by a gap, each train having at each of said holder frames a pivot connecting each of said frames to each of the adjacent frames for relative pivoting of said frames, whereby said trains are flexible and can follow a non-circular track;
    a set of vertically spaced holders removably supported in each of said holder frames;
    said gaps being alignable to form a service aisle; and means displaceable along said service aisle for removing a holder from a train whose gap is not aligned with said aisle.

2. The system defined in claim 1; further comprising means releasably connecting the holder frame to one side of each of said gaps to the respective holder frame of the respective train to the other side of the respective gap.

3. The system defined in claim 1, wherein each of said frames includes an outer frame connected via the respective pivot of the adjacent frames and an inner frame carrying the respective holders and separable in a direction transverse to the respective train from the respective outer frame.

4. The system defined in claim 3; further comprising means forming a path of substantially the same width as said gaps and crossing all of said tracks, and means displaceable along said path for separating from its respective outer frame and inner frame and the holders thereof.

5. The system defined in claim 4, wherein said means for separating includes a carriage displaceable above said path and above said trains, a pick-up element engageable in an inner holder in said path, and means for raising said pick-up element to raise an inner holder engaged thereby and for thereafter displacing said carriage along said path transverse to said tracks.

6. The system defined in claim 5, wherein said pick-up element is a vertically displaceable and horizontally extending fork and each of said inner frames is provided with a transversely open pocket in which said fork is receivable when the respective inner holder is in said path.

7. The system defined in claim 1, wherein said frame includes an outer frame and a pair of vertically spaced inner frames in said outer frame and each in turn holding a plurality of such holders, each of said inner frames of each of said outer frames being removable therefrom drawer-fashion.

8. The system defined in claim 1; further comprising a flexible chain connecting together said holders at said pivots.

* * * * *